May 2, 1939.  R. S. NELSON ET AL  2,156,954
REFRIGERATION
Filed July 26, 1937
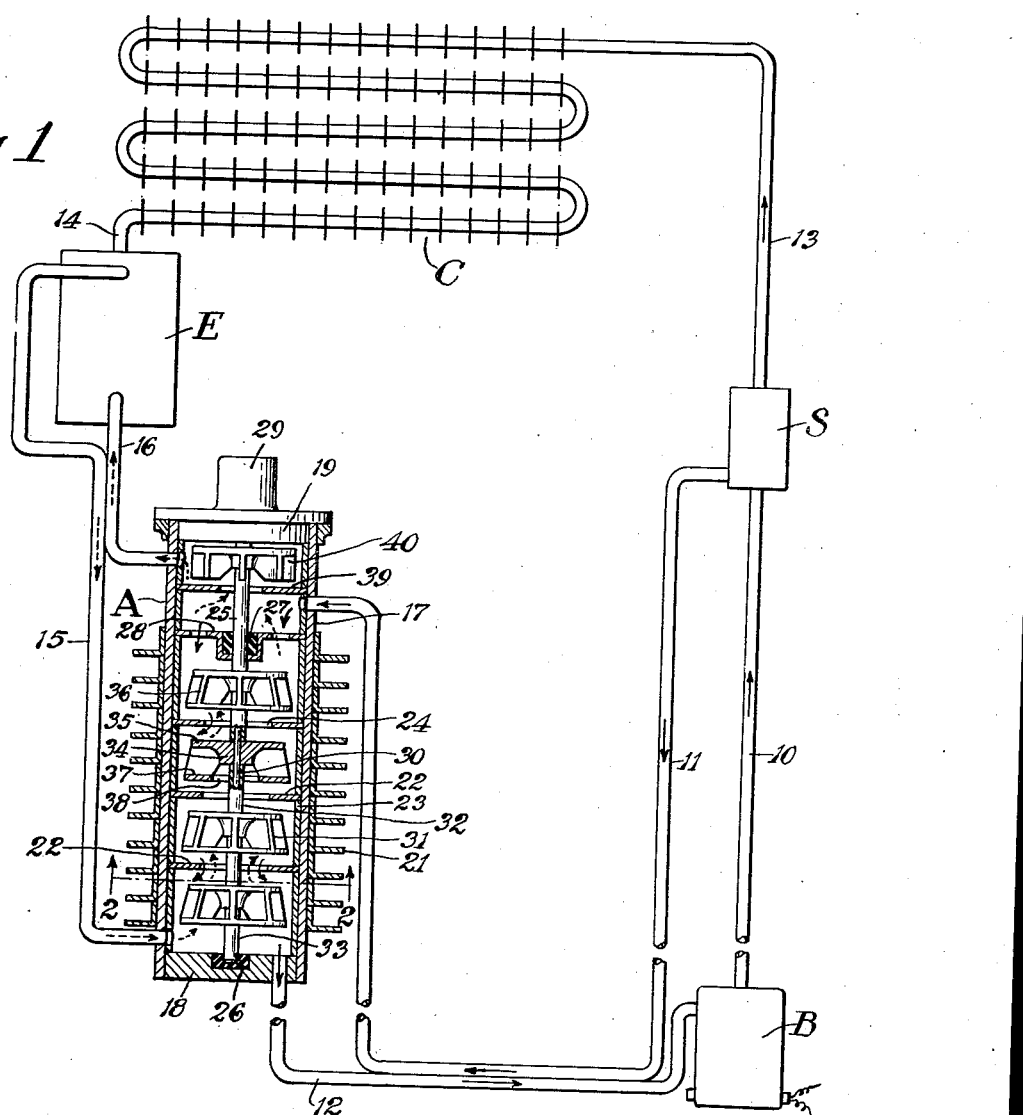
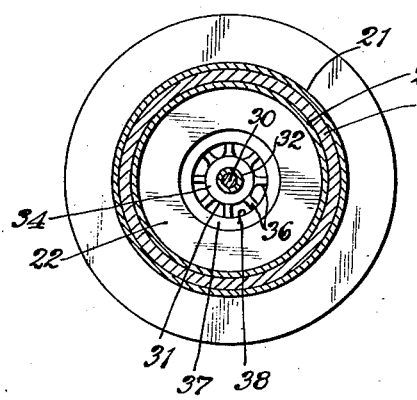
Inventors
Rudolph S. Nelson
Curtis C. Coons
by Harry S. Lemaire
Attorney.

Patented May 2, 1939

2,156,954

UNITED STATES PATENT OFFICE 2,156,954

REFRIGERATION

Rudolph S. Nelson, Larchmont, N. Y., and Curtis C. Coons, North Canton, Ohio, assignors to The Hoover Company, North Canton, Ohio, a corporation of Ohio Application July 26, 1937, Serial No. 155,786

7 Claims. (Cl. 62—119.5)

This invention relates to absorption refrigerating systems, and more particularly to the absorbers thereof.

Absorption refrigerating systems in which an inert gas is employed as a pressure equalizing medium are well known. While certain features of the present invention are applicable to systems in which no inert gas is employed, the arrangements illustrated are particularly suitable for use in an inert gas system.

In any absorption refrigerating system the problem of quickly and effectively absorbing the refrigerant in the absorption liquid is a rather difficult one and this difficulty is increased if the absorber is air cooled. The problem may be largely solved if the refrigerant and absorption liquids are brought into intimate contact in the absorber and the heat of absorption quickly dissipated.

Accordingly, it is one object of the present invention to provide means for causing refrigerant and absorption liquid in the absorber to come into very intimate contact with each other.

It is a further object of the invention to provide a compact and practical assembly for circulating inert gas through the absorber while keeping all the fluids therein in a state of agitation so that they are at all times intimately mixed.

It is still a further object of the invention to keep a large surface in the absorber wet with absorption liquid, particularly near the outside of the absorber so that the heat of absorption may be quickly dissipated.

Still another object resides in the provision of means for hermetically sealing the absorber from the atmosphere while accomplishing any of the above objects.

Other objects reside in certain novel features of the arrangement and construction of parts as will be apparent from the following description taken in connection with the accompanying drawing in which:

Figure 1 is an illustration of a continuous absorption refrigerating system with the absorber shown in vertical cross section and with the other parts diagrammatically illustrated.

Figure 2 is a horizontal cross sectional view of the absorber shown in Figure 1 the view being taken on the line 2—2 of Figure 1.

Referring to the drawing in detail and first to the arrangement of Figure 1, a conventional continuous absorption refrigerating system is illustrated as consisting of a boiler B, a gas separation chamber S, condenser C, an evaporator E and an absorber A, together with inter-connecting conduits as indicated. Absorption liquid, such as water, may be circulated between the boiler B, the gas separation chamber S and the absorber A by means of conduits 10, 11 and 12. The conduit 10 serves as a vapor lift pump for raising absorption liquid from the boiler B to the gas separation chamber S. From the chamber S the liquid flows by gravity through the conduit 11, the absorber A and the conduit 12 back to the boiler. The conduits 11 and 12 may be in heat exchange relationship as indicated.

Refrigerant, such as ammonia, is expelled from the solution in the boiler B and the gas separation chamber S by the application of heat thereto and flows through the conduit 13 into the condenser C which is preferably air cooled, from which it is drained as a liquid into the evaporator E through the conduit 14.

Inert gas, such as nitrogen or hydrogen, is circulated between the evaporator E and the absorber A by means of the gas conduits 15 and 16 which may be in heat exchange relation. This inert gas circuit also provides means for conducting vaporous refrigerant from the evaporator into the absorber where the refrigerant is again absorbed in the absorption liquid and returned to the boiler.

The present invention is concerned primarily with the absorber of this system and accordingly the absorber is shown in detail. The absorber may consist of a cylindrical vessel 17 which is constructed from material capable of withstanding the high pressures commonly encountered in absorption refrigerators. A bottom 18 and a top piece 19 are welded to the ends of the vessel 17 to form a closed sealed structure. This vessel is shown as being air cooled, heat radiating fins 21 being secured to the outside thereof. On the inside of the absorber vessel 17 a number of horizontally disposed baffles or plates 22 are provided, these being held in spaced relation by means of cylinders 23 preferably having a high heat conductivity. Each plate 22 has a large central opening therein as indicated at 24.

A shaft 25 extends the entire length of the absorber vessel 17 and is mounted for rotation in a rubber bearing 26 in the end plate 18 and in a rubber bearing 27 in a perforated upper plate 28. It has been found in practice that rubber bearings are suitable in this construction as they may be lubricated by the fluids in the system, particularly if ammonia is used as the refrigerant. The conduit 11, which supplies absorption liquid to the absorber, enters the vessel 17 above the upper plate 28 and maintains the bearing 27 in a moist condition. The bearing 26 is kept moist by the solution which collects on the bottom plate 18 before being discharged through the conduit 12.

An electric motor 29 is rigidly secured to the upper end of the vessel 17, as by welding. This electric motor may be of any known construction, but it should preferably be hermetically sealed or have its rotating element hermetically sealed to the absorber. A known type of electric motor in which the field construction is on the outside and the rotor on the inside of a dividing partition or casing may be employed for this purpose.

The motor 29 is connected to and drives a non-circular shaft 30 which extends the entire length of the absorber vessel 17. A number of gas circulating and liquid splashing elements 31 are non-rotatably mounted upon the shaft 30. These elements are suitably spaced apart by spacing collars 32 which non-rotatably receive the shaft 30 and abut those portions of the splashing and gas circulating elements 31 which engage the shaft 30. An end collar 33, which is similar to the collars 32 previously described, forms the bearing for the shaft 30 in the rubber bearing 26. The upper bearing for the shaft 30 is formed by one of the collars 32 which passes through the rubber bearing 27 as illustrated.

Each circulating and splashing element 31 comprises a splashing disc portion and a centrifugal fan portion. Each element comprises a central body portion 34 which engages the shaft 30, an upper solid disc portion 35, a plurality of spaced radial fan blades 36, and a bottom shroud and eye plate 37. The central body portion 34 does not extend the full depth of the element 31 but is spaced from the bottom shroud and eye plate 37, which is provided with a central opening 38, by the radial blades 36. All parts of the splashing and circulating element 31 are integrally formed. It will be noted that the maximum diameter of the plate 35 is less than the outside diameter of the element 37 whereby to permit free discharge of gas from the fan blades around the plate member 35.

The space above the plate 28 forms a liquid inlet and gas exit chamber due to the fact that liquid enters the absorber through the pipe 11 at this point and the gas exits from the absorber proper at this point. Gas discharged into the space above the plate 28 passes through a baffle plate 39 which is similar to the baffle plates 22 previously described. A centrifugal fan 40, which is mounted upon the shaft 30 similarly to the elements 31, is positioned in the chamber above the plate 39 and is constructed to discharge gases from the absorber vessel through the conduit 16.

In operation the weak solution formed in the chamber S discharges through the conduit 11 into the upper portion of the absorber vessel 17 above the plate 28. The liquid discharged onto the plate 28 splashes thereover and discharges through the perforations therein. A part of the liquid discharged from the plate 28 also lubricates the upper bearing 27.

The apparatus will be controlled in such fashion that the motor 29 will be energized whenever heat is supplied to the boiler B. Rotation of the motor and shaft 30 will cause the fan elements 31 and the fan 40 to circulate the inert gas through the absorber and evaporator system in the directions indicated by the dotted arrows. That is, the gases will be discharged from the absorber through the conduit 16, will pass upwardly through the evaporator in counterflow to the liquid refrigerant discharged thereinto from the conduit 14. The liquid refrigerant will evaporate into the inert gas stream and the resulting mixture of inert gas and refrigerant vapor will be returned to the bottom of the absorber through the conduit 15.

The liquid flows downwardly through the absorber by gravity in a path indicated by the solid arrows. Liquid discharged through the perforations in the plate 28 and the central openings in the baffle plates 22 drips onto the rapidly rotating top plates 35 of the gas circulating and liquid splashing elements 31 with the result that substantially horizontal sheet-like sprays of refrigerant liquid are formed. The elements 31 force inert gas upwardly through the sprays. The liquid discharged laterally by the discs 35 strikes the outer wall of the vessel 17 and flows downwardly against the baffle plates 22 which direct it toward the center of the absorber whereby it drips upon the top plate 35 of the subjacent gas circulating and splashing element 31.

Thus it will be seen that we have provided a refrigerating system wherein a single element functions positively to propel the pressure equalizing medium and at the same time creates finely divided sprays of absorption liquid whereby intimate contact is promoted between the absorption liquid and refrigerant-laden pressure equalizing medium.

In addition to forming sprays through which the refrigerant-laden pressure equalizing medium is forced the absorber vessel provides excellent heat exchange between the liquid and the surrounding medium whereby the absorber may be air-cooled. This follows from the fact that the absorption liquid is forcibly directed against the inner wall of the vessel 17 and flows downwardly along the walls in a thin film. Also, the thin film of absorption liquid on the inner wall of the vessel 17 is forcibly struck by the refrigerant-laden pressure equalizing medium discharged from the various circulating and splashing elements 31.

It will be understood that the fan 40 and the gas circulating portions of the elements 31 may be omitted with a system in which the inert gas, hydrogen for example, is circulated by the density differential in the gas columns entering and leaving the absorber. With such a system the inert gas will flow upwardly through the absorber in counterflow to the absorption.

If desired the gas circulating portions of the elements 31 may be omitted; in this event the fan 40 will produce gas circulation through the apparatus.

While only one embodiment of the invention has been illustrated herein, it is obvious that various changes may be made in the construction and arrangement of parts without departing from the spirit of the invention or the scope of the appended claims.

We claim:

1. An absorber adapted for use in an absorption refrigerating system comprising a closed vessel, means for causing absorption liquid to flow through said vessel, gas conduits connected to said vessel and a double shrouded centrifugal fan within said vessel for causing gas to flow therethrough and for splashing the absorption liquid over the inner wall of said vessel to bring the gas and liquid into intimate contact and for aiding in the transfer of heat to the exterior of said vessel.

2. An absorber adapted for use in an absorption refrigerating system comprising an elongated vessel, means for supplying absorption liquid to the upper end of said vessel, means for removing absorption liquid from the lower end of said vessel, gas conduits connected to said vessel, baffle plates within said vessel and extending transversely across the same, there being an opening in each baffle and rotating means in said vessel adapted to cause gas to flow therethrough and adapted to splash the absorption liquid about the inner surface of said vessel, said rotating means including a solid disc located below the opening in one of said baffle plates for catching liquid dripping through the opening and for throwing it about.

3. In an absorption refrigerating system, in combination, an evaporator, an absorber, conduits connecting the evaporator and absorber to provide a circuit for inert gas therebetween and means for circulating absorption liquid through said absorber, said absorber having a combined gas circulator and splashing means therein for promoting the circulation of the inert gas over its circuit and for bringing the gas into intimate contact with the absorption liquid, said combined gas circulator and splashing means including a number of baffle plates having openings therein and radially discharging centrifugal fans disposed between certain of said plates, the arrangement being such that the fans cause the gas repeatedly to flow outwardly in contact with the wall of said absorber in addition to the flow over the aforesaid circuit.

4. An absorber adapted for use in an absorption refrigerating system comprising a sealed vessel, power driven means within the vessel adapted to create sprays of absorption liquid and to propel a medium to be absorbed through said sprays, and bearings supporting said power driven means, the arrangement being such that said bearings are lubricated by one of the fluids in the absorber, said bearings being made of rubber.

5. An absorber for refrigeration systems comprising a vertically positioned vessel, a plurality of annular baffle plates positioned transversely of said vessel, a power driven shaft extending longitudinally of said vessel, a plurality of combined liquid spraying and double shrouded centrifugal gas circulating fans arranged alternately with said baffle plates, the arrangement being such that liquid may flow over the baffle plates onto the spraying elements to be projected onto the wall of said vessel in spray form and to form a thin film of liquid on said wall whereby the exothermic heat of absorption is efficiently dissipated to the surrounding medium.

6. An absorber for absorption refrigeration systems comprising an upstanding vessel, a plurality of annular baffles positioned transversely of said vessel and a plurality of combined liquid splashing and gas circulating elements arranged alternately with said baffles, each of said last mentioned elements comprising a disc adapted to generate a spray of absorption liquid dripping from the superposed baffle and a centrifugal fan beneath said disc adapted to force the medium to be absorbed upwardly through said spray, and power driven means for driving said elements.

7. That improvement in the art of refrigeration which includes the steps of imparting a propelling impulse to a pressure equalizing medium refrigerant vapor mixture in a given direction, placing a film of an absorbent for the refrigerant vapor in the path of the mixture, flowing the mixture along the film of the absorbent and in counterflow relationship therewith, forcing the mixture through a sheet-like spray of the absorbent, and flowing the mixture across the spray of the absorbent and in counterflow relationship therewith.

RUDOLPH S. NELSON.
CURTIS C. COONS.